Oct. 21, 1941.　　　　N. LUTHER　　　　2,259,760
MOTOR
Filed Dec. 11, 1940　　　2 Sheets-Sheet 1

INVENTOR
Newton Luther
BY
ATTORNEY

Oct. 21, 1941.　　　　N. LUTHER　　　　2,259,760
MOTOR
Filed Dec. 11, 1940　　　　2 Sheets-Sheet 2

INVENTOR
Newton Luther
BY
ATTORNEY

Patented Oct. 21, 1941

2,259,760

UNITED STATES PATENT OFFICE 2,259,760

MOTOR

Newlon Luther, New York, N. Y.

Application December 11, 1940, Serial No. 369,591

3 Claims. (Cl. 74—129)

This invention relates to new and useful improvements in motors, and has more particular reference to a lever arrangement for stepping up the delivered force of the motor.

More specifically, the invention proposes to particularly apply the lever arrangement to a motor having a reciprocating piston or pistons connecting with a connecting rod or rod systems which are connected with and drive a crank shaft. The motor itself may be of the gasoline, Diesel or any other variety.

Still further the invention contemplates the provision of a pivotally mounted lever for each connecting rod or system, and having one of its ends pivotally connected with the connecting rod or system, and its other ends provided with pawls cooperative with ratchet wheels mounted on a rotative shaft, and arranged for turning the shaft in one direction as the levers oscillate.

More specifically, the invention proposes the provision of a transmission system for connecting a propeller shaft, or any other kind of shaft with said rotative shaft.

Still further the invention proposes the utilization of means for locking said pawls against rearward motion during their power strokes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
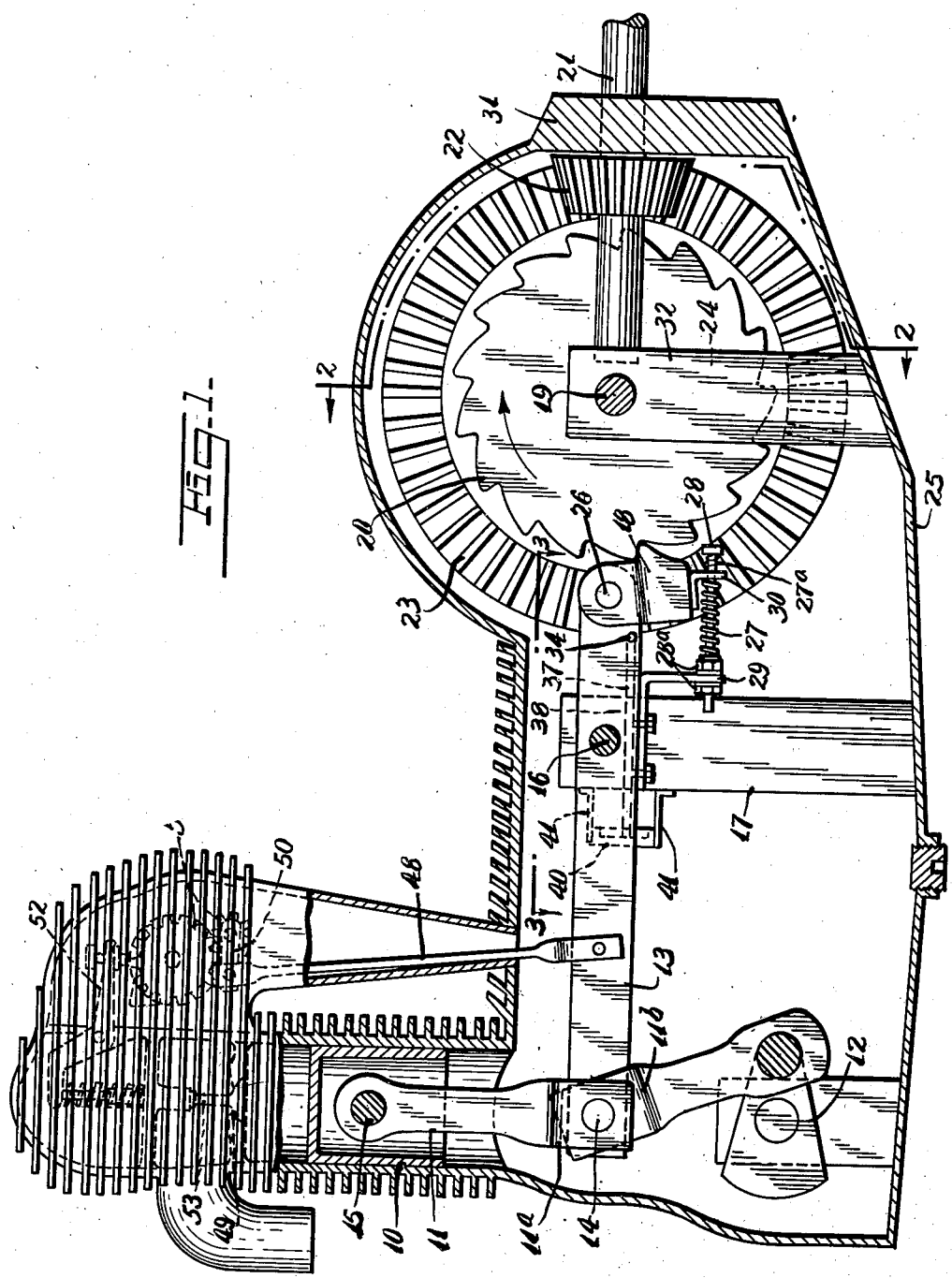
Fig. 1 is a vertical sectional view of a motor constructed in accordance with this invention.

The invention is applied to a motor having a reciprocating piston or pistons 10 connected with a connecting rod or rod systems 11 which are connected with and drive a crank shaft 12. This motor may be a gasoline motor, Diesel engine or other types. The particular design and construction thereof forms no part of this invention, and for this reason the details will not be disclosed, since persons skilled in the art will understand the construction and operation thereof.

A pivotally mounted lever 13 is provided for each connecting rod system 11 and has one of its ends pivotally connected with the connecting rod 11 system by a pintle 14. The connecting rod 11 system in the particular form of the invention as disclosed on the drawings is formed from two rod sections. There is an upper rod section 11a and a lower rod section 11b. These rod sections are forked and are pivotally connected together at adjacent ends by the pintle 14. The free end of the upper rod section 11a is pivotally connected by a pintle 15 with the piston 10. The free end of the lower rod section 11b is pivotally mounted on a crank of the crank shaft 12. The lever 13 is pivotally supported intermediate of its ends by a pintle 16 supported on a standard 17.

A pawl 18 is provided for each lever 13 for transmitting power when moved in one direction and idling when moved in the other direction. A rotative shaft 19 has a ratchet wheel 20 for each pawl 18 cooperative therewith, for turning the shaft 19 in one direction as the lever 13 oscillates. A propeller or other shaft 21 is rotatively mounted and is connected by a transmission system with the shaft 19. This transmission system includes a pinion 22 mounted on the shaft 21 and meshing with a gear wheel 23 mounted on the shaft 19.

The shaft 19 is rotatively supported in several standards 24 which are mounted within the case 25 of the motor. Each pawl 18 is pivotally mounted on each lever 13 by a pintle 26. Each pawl 18 is resiliently urged forward by a spring 27. The spring 27 is coaxially mounted on a bolt 28 which is mounted on a bracket 29 mounted on the lever 13. A lug 30 is mounted on the bottom end of the pawl 18 and slidably engages the bolt 28 and is engaged by the spring 27 which is arranged to urge the pawl forwards. The shaft 21 is rotative in a standard 31 arranged on a wall of the casing 25, and in a standard 32 which assists in rotatively supporting the shaft 19.

The clearance between the tooth of pawl 18 and the teeth of ratchet wheel 20 may be adjusted by adjusting nuts 28a to prevent pounding of the pawl against the ratchet wheel. A light cushion spring 27a is provided between the lug 30 and the head of bolt 28 to absorb the shock.

Means is provided for locking each pawl 18 against rearward motion during its power stroke. This means includes a bolt 34 slidably mounted through the lever 13 and adapted in an extended position to engage behind a rear edge of the pawl 18 to lock the pawl against rearward motion. The bolt 34 has a pin 35 engaging a slot 36 in a lever 37 which is pivotally mounted intermediate of its ends on a bracket 38 mounted on the side of the lever 13. The rear end of the lever 37 engages a cam track 39 formed in the block 40 supported by brackets 41 upon a stationary object, such as the standard 24.

The track 39 has straight vertical sides 39ª, and pointed top and bottom end portions 39ᵇ. Pawls 42 and 43 are mounted at the top and bottom end portions of the track 39 for directing the lever 37 in one direction. The top pawl 42 is pivotally supported by a pintle 44 and is urged against a stop 45 by a spring 46. The bottom pawl 43 is similarly, pivotally supported by a pintle 44 and is urged in one direction against a stop 45 by a spring 46. The parts are so arranged that when the lever 37 oscillates together with the oscillation of the lever 13, the end of the lever 37, which engages the track 39, will be caused to move around the track, in the direction of the arrows illustrated in Fig. 4.

The lever 48 shown in Fig. 1 is connected with the valves 49 of the motor through crank 50, transmission gears 51, bellcranks 52 and connecting rods 53. In place of this arrangement any other individual valve operating device may be used.

The operation of the device is as follows:

The motor will deliver power to the crank shaft 12 by the pistons 10 reciprocating. This reciprocation is transmitted by the levers 13 to the pawls 18, and then to the ratchet wheels 20 for continuously turning the shaft 19 in one direction. From the shaft 19 the power will be transmitted by the transmission 22 and 23 to the propeller shaft 21, or other driven shaft.

Figure 4:
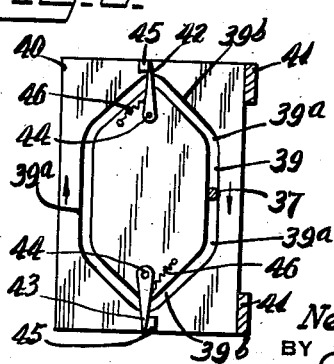
Fig. 4 is a fragmentary enlarged vertical sectional view taken on the line 4—4 of Fig. 3.

When the left hand ends of the levers 13 move upwards, as illustrated in Fig. 1, the pawls 18 will move downwards and idle over the teeth of the ratchet wheels 20. During this period the bolts 34 will be retracted, because the rear ends of the levers 37 are in the left hand branches 39ª of the tracks 39, as illustrated in Fig. 4.

During the downward motion of the left hand ends of the levers 13, the right hand ends will move upwards moving the pawls 18 upwards. During this upward motion of the pawls the bolts 34 will be extended, since now the rear ends of the levers 37 are running along the right hand sides 39ª of the tracks 39, as illustrated in Fig. 4. The pawls 18 now deliver power to the ratchet wheels 20, and this power is transmitted to the shaft 21.

Figure 2:
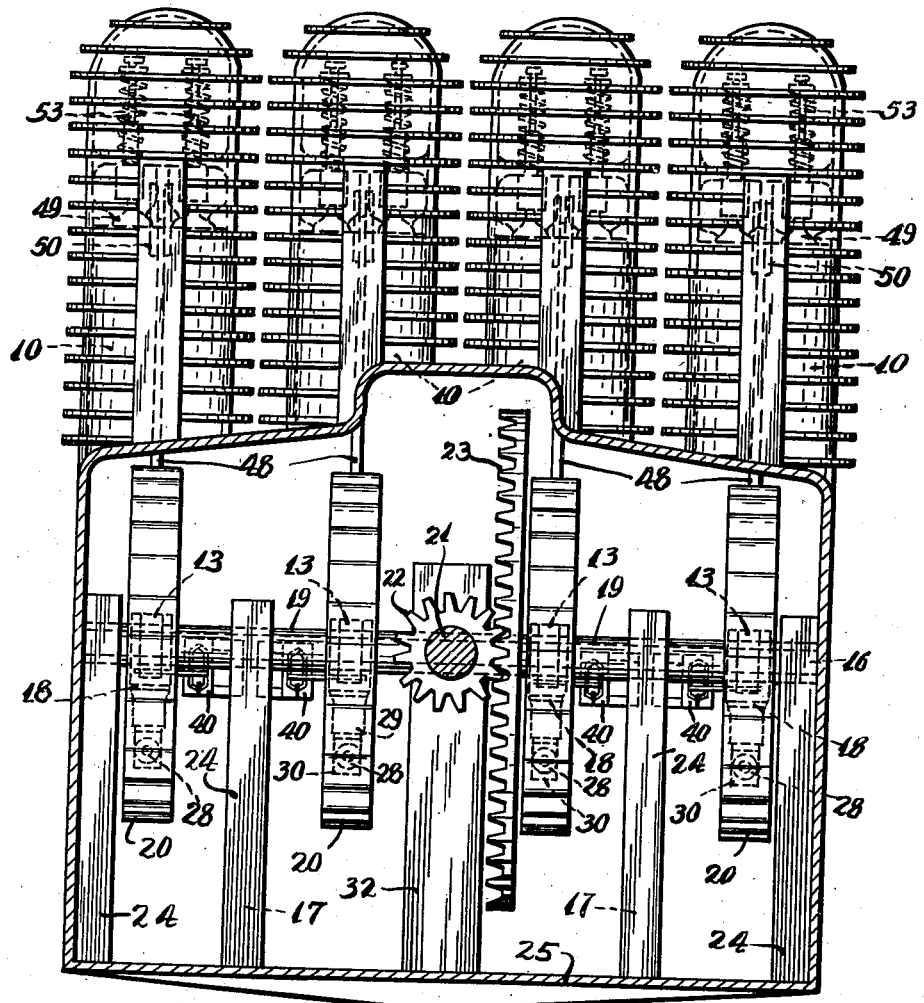
Fig. 2 is a transverse vertical sectional view taken on the line 2—2 of Fig. 1.
Figure 3:
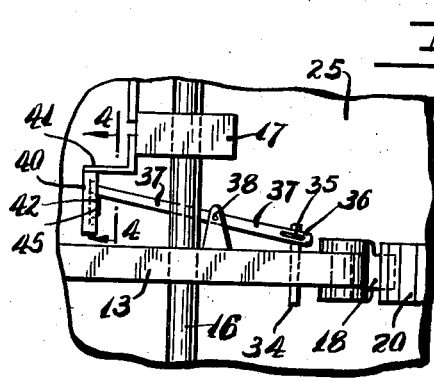
Fig. 3 is a fragmentary horizontal sectional view taken on the line 3—3 of Fig. 1.

From an inspection of Fig. 2 it should be noted that the shaft 21 is located centrally of the width of the motor. This arrangement is advantageous in that all of the cylinders of the motor are exposed for front cooling. This motor may be air cooled as shown, or of any other type, having one or more cylinders.

It is to be understood that the power in this device is delivered from the piston to the long end of the lever 13. The crank shaft 12 is provided merely as a balancing device to connect the pistons 10 and the various parts in the motor. The arm of lever 13 may be made of various lengths for transmitting the power stroke to the drive shaft 21.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, a lever pivotally mounted intermediate of its ends, a rotative shaft extended at right angles to said lever, a ratchet wheel on said shaft and having all of its teeth extended in one direction and located adjacent one end of said lever, means connected to the end of said lever opposed to the end located adjacent said ratchet wheel for oscillating said lever to cause the end of said lever located adjacent said ratchet wheel to oscillate in a path extending substantially tangentially of the path traversed by said teeth, a pawl pivotally mounted on the end of said lever adjacent said wheel and engaging said teeth to advance said wheel when said lever oscillates in one direction, and resilient means for urging said pawl to retain its engaged position with said teeth as said teeth move in an arc and the end of said lever adjacent said wheel moves tangentially thereof, and means for locking said pawl against pivoting during the power oscillation stroke of said lever to assist said resilient means in retaining said pawl in operative position.

2. In a device of the class described, a lever pivotally mounted intermediate of its ends, a rotative shaft extended at right angles to said lever, a ratchet wheel on said shaft and having all of its teeth extended in one direction and located adjacent one end of said lever, means connected to the end of said lever opposed to the end located adjacent said ratchet wheel for oscillating said lever to cause the end of said lever located adjacent said ratchet wheel to oscillate in a path extending substantially tangentially of the path traversed by said teeth, a pawl pivotally mounted on the end of said lever adjacent said wheel and engaging said teeth to advance said wheel when said lever oscillates in one direction, and resilient means for urging said pawl to retain its engaged position with said teeth as said teeth move in an arc and the end of said lever adjacent said wheel moves tangentially thereof, and means for locking said pawl against pivoting during the power oscillation stroke of said lever to assist said resilient means in retaining said pawl in operative position, said latter means, comprising a bolt slidably extended through said lever in a direction at right angles to the direction of pivoting of said pawl and extending across the back face of said pawl on the power stroke of said lever, and means for retracting said bolt on the return oscillation stroke of said lever to free said pawl to idle over said teeth.

3. In a device of the class described, a lever pivotally mounted intermediate of its ends, a rotative shaft extended at right angles to said lever, a ratchet wheel on said shaft and having all of its teeth extended in one direction and located adjacent one end of said lever, means connected to the end of said lever opposed to the end located adjacent said ratchet wheel for oscillating said lever to cause the end of said lever located adjacent said ratchet wheel to oscillate in a path extending substantially tangentially of the path traversed by said teeth, a pawl pivotally mounted on the end of said lever adjacent said wheel and engaging said teeth to advance said wheel when said lever oscillates in one direction, and resilient means for urging said pawl to retain its engaged position with said teeth as said teeth move in an arc and the end of said lever adjacent said wheel moves tangentially thereof, and means for locking said pawl against pivoting during the power oscillation stroke of said lever to assist said resilient means in retaining said pawl in operative position, said latter means, comprsing a bolt slidably extended through said lever in a direction at right angles to the direction of pivoting of said pawl and extending across the back face of said pawl on the power stroke of said lever, and means for retracting said bolt on the return oscillation stroke of said lever to free said pawl to idle over said teeth, comprising a lever pivotally mounted on said lever and having one end pivotally attached to said bolt, and a stationarily mounted cam arranged to be engaged by the free end of said latter lever to pivot said latter lever and extend and retract said bolt as said first lever oscillates.

NEWLON LUTHER.